Patented Oct. 4, 1949

2,483,782

UNITED STATES PATENT OFFICE 2,483,782

PREPARATION OF PLURAL SILICA-CONTAINING HYDROGEL CATALYSTS

Jerry A. Pierce, Baton Rouge, La., assignor to Standard Oil Development Company, a corporation of Delaware No Drawing. Application November 22, 1946, Serial No. 711,797

3 Claims. (Cl. 252—453)

The present invention is concerned with an improved procedure for the common precipitation of two sols which set simultaneously to form a homogeneous hydrogel. The invention is more specifically concerned with gels comprising silica, and is especially directed to the preparation of multiple component gels. In accordance with my invention, multiple component gels and particularly catalysts are prepared by allowing a sol comprising silica to thicken slightly and then to add oxides, sols, or solid components, as for example alumina and the like.

It is known in the art to prepare silica gels by various procedures. These gels are used per se or are used as base materials, or as components in catalysts for various treating operations. For example, it is known in the art to improve the quality of oils, particularly petroleum oils, by treating the same with a catalyst comprising a silica gel under various operating conditions. The operation is generally conducted at temperatures in the range from about 600° F. to about 1100° F. The catalyst generally comprises silica gel used in conjunction with magnesium, zirconium, beryllium, aluminum components and the like.

Heretofore, the silica gels have been prepared by various procedures. One method is to prepare the silica hydrogel by mixing an alkali silicate with an acid. The alkali silicate usually comprises a sodium silicate ($Na_2O.3.25SiO_2$) solution having a specific gravity of about 1.2. This is mixed with sulfuric acid having a specific gravity somewhere in the range of about 1.19. If it is desired to impregnate the silica gel with a catalytic material, the hydrosol may be impregnated with a soluble salt of the desired impregnating metal, or the silica hydrosol may be allowed to gel. The resulting hydrogel may be washed and soaked in a solution comprising the salt of the desired impregnating metal or metals.

One method employed for the preparation of a silica-magnesia catalyst is to prepare the hydrogel by the mixing of a silicate and sulfuric acid. The hydrogel is washed, mixed and granulated with magnesia and water. The mixture is passed through a colloid mill and homogenized. The catalyst is aged at room temperature for a period from about 24 to 72 hours. Elevated temperatures may also be employed in which case, the aging time period is reduced to a period of from about 5 to 10 hours. The catalyst is dried at a temperature in the range from about 200° F. to 270° F. Another method utilized for the preparation of the silica-magnesia catalyst is to prepare the silica hydrogel by mixing sulfuric acid and an alkali metal silicate. The silica hydrogel is washed and impregnated with magnesium sulfate. The impregnated silica hydrogel is treated with an ammonia solution to precipitate the magnesia. This may require a time period of from about 8 to 10 hours. A preferred method of preparing a catalyst comprising silica and magnesia is to add magnesia to a silica hydrosol or to a silica hydrosol impregnated with a metal salt such as with an aluminum salt. The mixture is washed preferably at elevated temperatures. The general process comprises adding magnesia, preferably as a slurry in water, to a silica hydrosol which has been impregnated with a salt, as for example, with an aluminum salt. The action of magnesia is to neutralize the free acid, thus causing rapid setting of the hydrosol to the hydrogel and also to decompose the aluminum salt or other salt present, causing precipitation of alumina within and throughout the gel. Excess magnesia used over these requirements remains in the finished product as magnesia. The magnesia employed to neutralize the acid and the salt of the added third metal, reacts to form magnesium sulfate which is removed upon washing. If it is desired to produce a gel comprising silica and magnesia, excess magnesia is added preferably as a water slurry over that required to neutralize the excess acidity, thus causing the formation of a gel comprising silica and magnesia.

I have now discovered an improved process for the preparation of plural gels and for the preparation of multiple component catalysts. My process comprises, for example, allowing a silica sol to thicken slightly before the addition of another sol. By proceeding in this manner, precipitation of the silica sol is prevented upon the addition of the secondary sol.

As previously discussed, my invention is particularly concerned with an improved process for the preparation of a "true plural sol." A true single component sol is one consisting of a single specie, such as, an alumina sol, a silica sol, a beryllium sol and the like. By a "true plural sol" or "true multiple component sol" is meant one containing more than one specie. It may, for example, consist of a mixture of true silica sol and a true alumina sol prepared by adding one to the other in such quantities and under such conditions that the mixture is still a transparent liquid. This transparent liquid contains no precipitated material and, if made properly, will set after a period of time to a perfectly homogeneous hydrogel, still transparent or opalescent. On washing the by-products of reaction from the material and drying, a hard homogeneous solid gel is formed, which has the physical characteristics of a single component gel. By by-products is meant the sodium sulfate or sodium chloride formed in the silica sol by reaction of sodium silicate on the respective inorganic acids.

The true plural sols of my invention are prepared preferably by initially preparing a silica sol and then permitting this silica sol to thicken somewhat before the addition of the secondary sol. The secondary sols may comprise any suitable substance, such as an alumina sol, a beryllium sol and the like.

The extent to which I allow my silica sol to thicken before the addition of the secondary sol can be learned by observation after a few trials. Generally, when the sol has reached the consistency of raw egg albumen, I have found this to be the time to add the other component. My experience has disclosed that just prior to the acquirement of the correct viscosity of the silica sol, it becomes slightly opaque and acquires, what is commonly known as, the Tyndall Effect. By this is meant that a change in optical properties occurs whereby the sol remains transparent when looked through the sample, and almost opaque when reviewed by reflected light. The characteristic color of silica sol under these conditions is light blue. The silica sol usually should be allowed to thicken to a viscosity of from 1000 to 5000 centipoises at 68° F. A particular technique which may be employed is to allow the silica sol to thicken to a higher viscosity than egg albumen and then to stir at this point which will tend to lower the viscosity long enough to incorporate other ingredients. Setting will then continue after the addition of the other ingredients.

The process of my invention may be more readily understood by the following examples illustrating embodiments of the same.

Example I

A silica sol was prepared by mixing a sodium silicate solution having a specific gravity of about 1.21 with a sulfuric acid solution having a specific gravity of 1.19. The sol was allowed to thicken to the consistency of glycerin. An alumina sol was prepared and mixed with the thickened silica sol. The mixture set within 10 minutes to form a homogeneous silica alumina hydrogel. The gel was washed free of sodium sulfate, dried at a low temperature and then activated by heating for three hours at a temperature in the range from about 850° F. to about 900° F.

Example II

Catalyst prepared in accordance with Example I was employed to crack gas oil boiling in the range from about 400° F. to 700° F. The results of these operations are as follows:

| Operation | Volume Per Cent Yield Naptha Boiling about 100° F. to 400° F. |
|---|---|
| A | 60 |
| B | 54.5 |
| C | 55 |
| D | 55.5 |

Example III

The catalyst prepared in accordance with Example I was subjected to a temperature of 1050° F. and at 60 pounds per square inch in the presence of steam. The yield of naphtha product secured when the steam treated catalyst was utilized to crack a gas oil was about 32%. Since steam treatment causes marked degeneration of most catalysts, it is apparent from the relatively high yield of 32% that my catalyst has a high resistancy to steam treatment. This is particularly desirable since steam is employed in the regeneration step in the fluid catalytic process.

Example IV

A catalyst prepared in accordance with the procedure described in Example I. This catalyst was subjected to treatment at 1600° F. for 24 hours. The yields of naphtha product secured when this catalyst was employed to crack gas oils in two operations were 45% for the first operation and 46% for the second operation. Here again, my catalyst shows a marked resistance to localize overheating when the catalyst is regenerated.

My invention is particularly directed towards the production of improved plural gels. The invention is specifically applicable to the preparation of homogeneous plural gels, one constituent of which comprises silica. In accordance with my process, I prepare a sol of the respective constituents which I intend to mix. I then allow the silica sol to thicken as described heretofore, and then add to the silica sol a sol of the other constituent. I thus secure a common precipitation of two sols to form a homogeneous hydrogel. My hydrogels may be used per se, but are preferably employed in conjunction with other active catalysts for various treating operations.

The process of my invention is not to be limited by any theory as to mode of operation, but only in and by the following claims in which it is desired to claim all novelty.

I claim:
1. Improved process for the preparation of homogeneous plural hydrogels comprising silica which comprises preparing a silica sol, allowing said silica sol to thicken to a viscosity of about 1000 to 5000 centipoises at a temperature of about 68° F., adding to said thickened silica sol selected from the group consisting of alumina and beryllia sols a secondary sol whereby common precipitation of the sols is simultaneously secured to form a homogeneous plural hydrogel.
2. Process as defined by claim 1 wherein the secondary sol comprises an alumina sol.
3. Process as defined by claim 1 wherein the secondary sol comprises a beryllia sol.

JERRY A. PIERCE.

REFERENCES CITED

The following references are of record in the file of this patent:

UNITED STATES PATENTS

| Number | Name | Date |
|---|---|---|
| 1,577,187 | Patrick | Mar. 16, 1926 |
| 1,756,625 | Behrman | Apr. 29, 1930 |
| 2,271,319 | Thomas | Jan. 27, 1942 |
| 2,370,200 | Shabaker | Feb. 27, 1945 |
| 2,396,758 | Stratford | Mar. 19, 1946 |
| 2,405,408 | Connolly | Aug. 6, 1946 |